United States Patent
McClintock et al.

(10) Patent No.: US 9,946,619 B1
(45) Date of Patent: Apr. 17, 2018

(54) SIMULATING SERVICE DISRUPTIONS FOR AN OPERATIONAL PRODUCTION SYSTEM

(71) Applicant: Amazon Technologies, Inc., Seattle, WA (US)

(72) Inventors: Jon Arron McClintock, Seattle, WA (US); George Nikolaos Stathakopoulos, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 73 days.

(21) Appl. No.: 14/977,306

(22) Filed: Dec. 21, 2015

(51) Int. Cl.
| | | |
|---|---|---|
| *G06F 11/00* | (2006.01) | |
| *G06F 11/26* | (2006.01) | |
| *G06F 11/22* | (2006.01) | |
| *G06F 11/14* | (2006.01) | |

(52) U.S. Cl.
CPC ........ *G06F 11/261* (2013.01); *G06F 11/1451* (2013.01); *G06F 11/1464* (2013.01); *G06F 11/2205* (2013.01); *G06F 2201/815* (2013.01); *G06F 2201/84* (2013.01)

(58) Field of Classification Search
CPC ............... G06F 11/261; G06F 11/2205; G06F 11/1464; G06F 11/145; G06F 2201/84; G06F 2201/815

USPC .......................................................... 714/41
See application file for complete search history.

(56) References Cited

U.S. PATENT DOCUMENTS

| | | | |
|---|---|---|---|
| 9,762,467 B2 * | 9/2017 | Willink ............... | H04L 43/0805 |
| 2017/0091069 A1 * | 3/2017 | Fujiwara ............... | G06F 11/368 |
| 2017/0150239 A1 * | 5/2017 | Davis ...................... | H04Q 9/00 |

* cited by examiner

*Primary Examiner* — Yair Leibovich
(74) *Attorney, Agent, or Firm* — Lee & Hayes, PLLC (57) ABSTRACT

The techniques described herein provide evaluations of a production system's ability to recover from a service disruption without actually disrupting service to the production system. In some examples, a live production system is at least partly duplicated to create a shadow production system that is a quarantined copy of the production system. Traffic between the production system, client devices, and possibly dependency services may be replicated onto the shadow production system while a recovery simulation service induces a specified type of service disruption onto the shadow production system. Behavior of the shadow production system during service disruption is used to identify performance differences and to evaluate expected recovery characteristics of the live production system.

20 Claims, 5 Drawing Sheets

SIMULATING SERVICE DISRUPTIONS FOR AN OPERATIONAL PRODUCTION SYSTEM

BACKGROUND

Various types of service disruptions may periodically affect a production system during its operation. In some cases, a service disruption may be anticipated, or even planned, and actions may be taken to minimize associated costs. For example, the production system may benefit in terms of performance from periodically undergoing a reboot procedure. In some cases, costs associated with the reboot procedure may be minimized by scheduling the reboot procedure to occur when production system traffic is minimal. In other cases, a service disruption may be unanticipated in which case it may be difficult to identify appropriate actions to avoid the service disruption altogether or at least minimize associated costs. For example, an unexpected spike in product demand may result in heightened production system traffic and ultimately cause the production system to fail. In such a case, the failure may result in not only customer dissatisfaction but also missed sales opportunities as potential consumers are unable to complete purchases through the production system during the failure.

Service disruptions are typically avoided to the extent possible due to the costs and unpredictability as to how a production system will recover. However, even a scheduled reboot procedure may be optimized to minimize unwanted impact on the clients. Moreover, following an unplanned service disruption developers may better understand vulnerabilities of the production system and take appropriate corrective action.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

This disclosure provides systems and methods for evaluating recovery characteristics of a production system such as an ability of the production system to recover from anticipated or unanticipated service disruptions. It is an object of the disclosure to enable a subscriber of a web hosting service, e.g. a virtualized distributed computing resource or a cloud computing service, to simulate (e.g. to "induce" or "cause") a service disruption on a shadow production system (e.g. a duplicate of a "live" or "real" production system) in order to evaluate recovery characteristics of the "live" production system without incurring costs of an actual service disruption. Various types of service disruptions may be simulated on the shadow production system and insight gained from the simulations may be used to improve recovery characteristics of the production system. For example, a graceful reboot may be simulated multiple times on the shadow production system while modifying a cache management process of the shadow production system to identify an optimal cache management process that minimizes cache misses. Furthermore, a spike in client traffic may be simulated onto the shadow production system to estimate a capacity of the production system or to determine a benefit associated with increasing an elasticity of the production system.

In various implementations, a subscriber of a web hosting service such as a cloud computing service may select a production system that is in live operation, e.g. actively receiving production requests from clients and generating production responses. Although the production system may be hosted by the web hosting service, it is within the scope of the present disclosure that other production systems may also be evaluated. For example, production systems that are hosted by a competing web hosting service or which are independently operated such as by small business owned servers. The subscriber may also select a type of service disruption which poses a hazard to the production system. For example, the production service may be limited in terms of capacity and elasticity and, therefore, sharp increases in client traffic may potentially disrupt service. Moreover, operational performance of the production system may benefit from periodically undergoing a reboot procedure. Accordingly, the subscriber may find value in an evaluation of the production system's recovery to live operation from the reboot procedure.

Although the subscriber could reboot the production system and evaluate the recovery thereof to live operation, e.g. steady state operation based on typical conditions, doing so may unnecessarily disrupt client traffic to the production system and, therefore, may disrupt the subscriber's business operations. Moreover, due to real-life fluctuations in client traffic levels and the variations in client requests, it may be impractical to accurately discern performance differences between live operation and disrupted operation, i.e. operation during the service disruption.

Therefore, in certain implementations, the production system may be at least partially duplicated to create a shadow production system that does not affect the operation of the "live" production system. For example, the production system may be substantively duplicated so that the core functionality of the shadow production system mirrors that of the production system. In some implementations, the shadow production system may be non-substantively modified to effectively implement the shadow production system, e.g. routing addresses and internal clock data may be altered if helpful in mirroring substantive functionality of the system. Stated alternatively, in some implementations, the shadow production system functions substantively identical to the production system but includes changes necessary for the system to retain substantive functionality without affecting the production system. Moreover, client traffic between one or more clients may be replicated without affecting the actual receipt of production requests or delivery of production responses by the production system, e.g. client traffic may be forked onto a recovery simulation service. A service disruption is then simulated onto the shadow production system while the production system remains in live operation. For example, if the selected service disruption is a soft reboot (e.g. a "graceful" shutdown and startup) then the production system may remain live while one or more servers of the shadow production system are logged onto to initiate the corresponding reboot process during which applications are shut down gracefully.

During the simulated service disruption, shadow production requests which are based on "real" production requests may be forwarded (e.g. "sent") to the shadow production system in a similar manner, e.g. a similar rate or other relevant parameter, as the "real" production requests were sent to the production system. Although under similar operating conditions the shadow production service would generally respond to the shadow production requests in a substantively similar manner as the production system would respond to the production requests, the simulated service disruption may result in performance differences between the production system, e.g. which remained in live operation unaffected by the service disruption, and the shadow production system. Performance differences may include, for example, a delay in generating responses, an inability to generate responses (e.g. a requesting client may receive an error message), or variations within generated responses. It should be appreciated that other performance differences may also result from the service disruption.

By analyzing the performance differences, an evaluation of recovery characteristics of the production system may be produced. In particular, the shadow production system may be configured to function substantively similar, or even identical, to the "real" production system and, therefore, may be used to model the expected behavior of the "real" production system. For example, the observed duration of a soft reboot procedure on the shadow production system may be representative of the duration of time the production system may take to undergo its own soft reboot procedure. Furthermore, modifications may be made to the shadow production system and subjected to simulated service disruptions to validate or optimize corresponding modifications to the production system prior to production launch of the modifications. In some implementations, the evaluation of the recovery characteristics may include proposed modifications, e.g. to the production system software and/or computing architecture, which are forecast by the recovery simulation service 110 (or a human judge evaluating the performance differences) to improve the production systems recovery characteristics, e.g. in terms of speed of recovery or resilience to malicious attacks.

The techniques and systems described herein may be implemented in a number of ways. Example implementations are provided below with reference to the figures.

Figure 1:
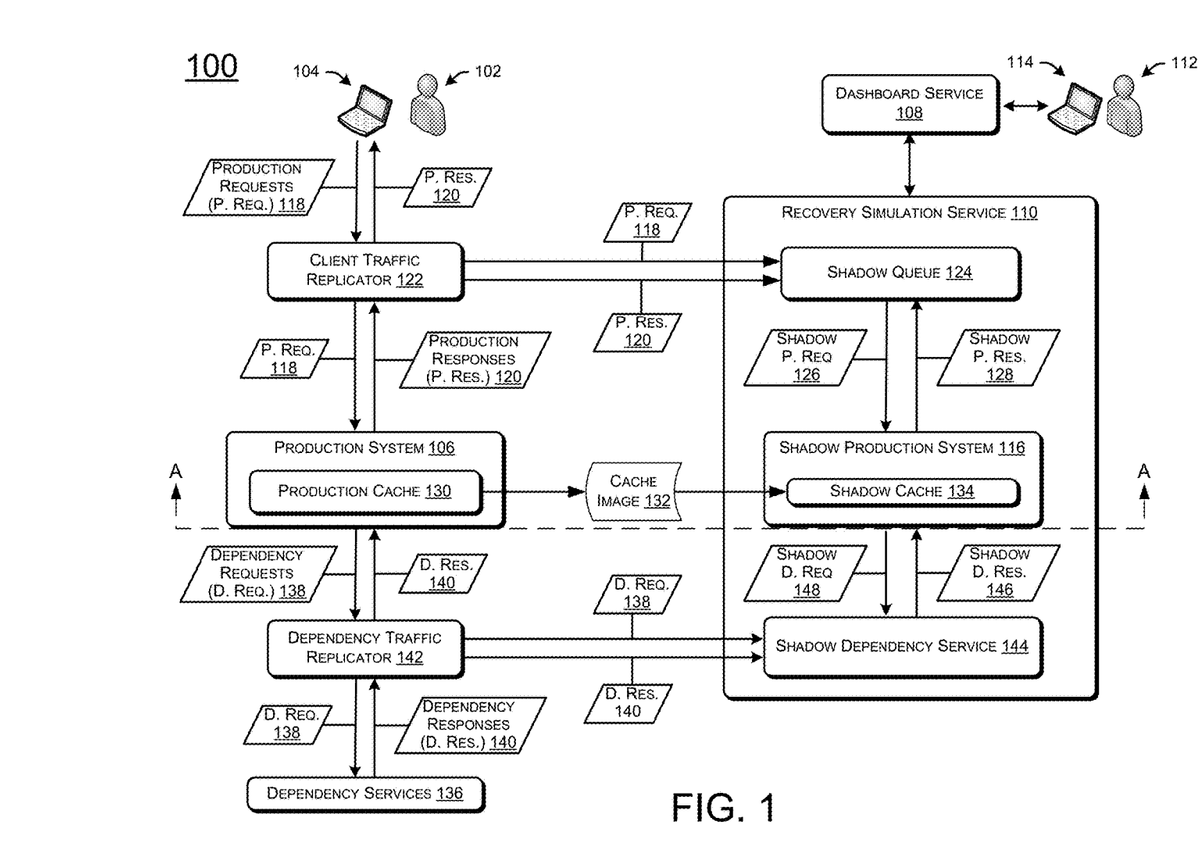
FIG. 1 is a schematic diagram of an illustrative environment that provides simulated service disruptions to one or more shadow production systems using client traffic that is replicated from one or more production systems.

FIG. 1 is a schematic diagram of an illustrative environment 100 that provides simulated service disruptions to one or more shadow production systems using client traffic that is replicated from one or more production systems. As shown in FIG. 1, the illustrative environment 100 includes one or more clients 102 operating one or more client devices 104 and a production system 106. The production system 106 may be, for example, a web based service such as an online marketplace or an online gaming environment service and the one or more clients 102 may be users of the web based service. The illustrative environment further includes a dashboard service 108, provided by or in communication with a recovery simulation service 110, through which a subscriber 112 operating a subscriber device 114 may select the production system 106 and at least one type of service disruption which poses a hazard to the production system 106. The subscriber 112 may subscribe to a cloud computing service that hosts the production system 106 or the recovery simulation service 110 or both. It should be appreciated that the subscriber 112 may or may not pay a form of compensation in association with a subscribed to service. For example, the subscriber 112 may "subscribe" to the recovery simulation service 110 simply by using the recovery simulation service 110 regardless of whether compensation for the service is provided. The illustrative environment 100 further includes a shadow production system 116 which may be an at least partial duplicate of the production system 106 and which does not affect live operation of the production system 106. For example, the shadow production system 116 may operate in parallel to the production system 106; however, inducing a service disruption on the shadow production system 116 will not similarly induce a service disruption on the production system 106. In some implementations, the shadow production system 116 may be a mirror copy, in terms of both computing resources and associated software, of the production system 106. While shown as stand-alone items, the production system 106 and the shadow production system 116 may be operated by system resources of a third-party web hosting service, independently operated system resources (e.g. servers owned and operated by the subscriber 112), or a cloud computing service which hosts the production system 106 or the recovery simulation service 110 or both. These system resources may be computing devices, distributed or non-distributed computing services, server farm(s) or other types of resources that can execute the various software systems. For example, the production system 106 may comprise distributed computing resources located in three distinct geographic regions and hosted by multiple hosting service providers. In such a case, the shadow production system 116 could be duplicated onto the same hosting service providers in the same geographic locations.

In operation, the one or more clients 102 (e.g., a downstream consumer or user) may, using a client device(s) 104, transmit a production request 118 for electronic data from the production system 106. However, in some implementations, the production request 118 may be a request generated by another service, the production system 106, or another process, and may not be a human-generated request. The production system 106 may be part of an electronic marketplace, an electronic financial service, a messaging service, a social network, and/or any other service that exchanges electronic data with users. The production system 106 may operate a current and/or approved version of production software that is currently deployed to fulfill production requests 118. In particular, the production system 106 may operate the production software to intake and prioritize production requests 118 and to generate production responses 120 to fulfill the production requests 118.

In some implementations, a client traffic replicator 122 replicates at least some client traffic, such as the production requests 118 and the production responses 120, onto the recovery simulation service 110. In some implementations, production requests 118 are replicated into a shadow queue 124 of the recovery simulation service 110. The production system 106 processes the production requests 118 normally using the production version of the software and replies with production responses 120. In the example implementation shown in FIG. 1, the client traffic replicator 122 may act as a relay or fork while also receiving the production requests 118 and production responses 120 and forwarding each to their respective recipients. While the example implementation shown in FIG. 1 shows the client traffic replicator 122 operating as a relay in the manner discussed above, this is not limiting and has been done for ease of illustration. In other implementations, the production system 106 could reply directly to the one or more client devices 104 without the client traffic replicator 122 acting as relay. Preferably, the client traffic replicator 122 does not affect or disrupt client traffic between the one or more clients 102 and the production system 106, e.g. the presence of the client traffic replicator 122 is preferably imperceptible to the one or more clients 102 and the production system 106.

Based at least partially on replicated client traffic, shadow production requests 126 may be forwarded to the shadow production system 116 for processing. In some implementations, the shadow production requests 126 may be created by duplicating the production requests 118. It should be appreciated, however, duplication of the production requests 118 may utilize a protocol to determine and implement modifications necessary to ensure that the functioning of the shadow production system 116 during the service disruption mimics how the production system 106 would function during a similar service disruption but without affecting "real" client traffic. For example, a protocol may be used to alter non-substantive portions of particular production requests such as time/date stamps (e.g. to align shadow production requests to the perspective of the shadow production system 116) and/or IP addresses (e.g. to ensure that shadow production requests 126 are routed to the shadow production system 116 and not the "real" production system 106 and also that shadow production responses 128 are not forwarded to client device(s) 104).

The shadow production system 116 processes the shadow production requests 126 and, when operating under similar conditions as the production system 106, typically generates shadow production responses 128 that are identical to or substantively identical to corresponding "real" production responses 120. Differences between the shadow production responses 128 and the production responses 120 may include different time stamps associated with the responses, for example, since the shadow production responses may be generated after the production responses in some instances. In some implementations the recovery simulation service 110 may forward shadow production requests 126 to the shadow production system 116 at the same rate as the production requests 118 are forwarded to the production system 106. The recovery simulation service 110 may then compare the production responses 120 to the shadow production responses 128, for example with regards to either substance or a rate of receipt, to validate that the shadow production system 116 operates as a functional duplicate of the production system 106. Such a validation may serve to increase a confidence level that the recovery characteristics of the shadow production system 116, which will be observed during a simulated or induced service disruption, are sufficiently representative of the "real" production system 106.

In some implementations, the production system 106 includes a production cache 130 which may be populated and utilized to reduce a load on processing resources of the production system 106. In particular, the production cache 130 may utilize a write policy to determine which data to write to the production cache 130 and also when to overwrite data that has become temporally stale. The production cache 130 may be continuously populated and repopulated during live operation to maintain temporally relevant data in the production cache 130 so that cache hits are maximized. Furthermore, the amount of time that particular data takes to become temporally stale may depend on the nature of the data. For example, information associated with a production request for sporting event score information may become outdated very quickly during the sporting event as the score may rapidly change. Accordingly, the production cache 130 may overwrite data corresponding to the sporting event at short intervals during the sporting event. However, following the sporting event production requests for score information corresponding to the sporting event may still be plentiful such that the associated data should remain in the production cache 130; however, because the score becomes static once the sporting event is finished the data no longer becomes outdated and, therefore, no longer needs to be updated. Eventually, as production requests corresponding to the score information become infrequent the data may be overwritten with more temporally relevant data. A cache image 132 may be stored which includes representations of the state and contents of the production cache 130 at one or more points in time. The cache image 132 may be copied onto a shadow cache 134 and used to determine a performance benefit (or loss) associated with prepopulating the shadow cache 134 during a system recovery. In some implementations, the performance benefit of prepopulating the shadow cache may be relative to run time population of the shadow cache by the shadow production system, e.g. requiring the shadow production system to process all requests without the benefit of the shadow cache while prioritizing potential cache entries based on a probability of the same resulting in cache hits (as opposed to cache misses).

In some implementations, the production system 106 may be a fully independent system in the sense that no external information or processing is used to fulfill the production requests 118. For example, any processing resources and databases used to process the production requests 118 and generate production responses 120 may be internal to the production system 106. Therefore, the foregoing components of the illustrative environment 100, e.g. those components illustrated above the dashed line A-A, may be sufficient to implement the systems and methods described disclosed herein.

In various other implementations, however, one or more dependency services 136 may provide information or supplementary processing resources to the production system 106. In particular, in processing the production requests 118 the production system 106 may transmit dependency requests 138 to one or more third party data bases or web services, one or more external storage layers, or any other remote or external service. For example, in an implementation wherein the production system 106 is an online retailer that offers both its own merchandise as well as merchandise from third party vendors on a web based retail site, fulfillment of particular ones of the production requests 118 may utilize information and processing resources which are external to the production system 106. Continuing with this example, a client may submit a production request for information associated with cycling accessories, e.g. cycle lights, to the production system 106. The production system 106 may insert into a corresponding production response cycle lights offered by the online retailer, if any, and may also transmit a dependency request to one or more third party vendors to supplement search results to be provided in the production response. Accordingly, dependency responses 140 may be generated and transmitted to the production system 106 in response to dependency requests 138.

In some implementations, a dependency traffic replicator 142 replicates at least some dependency traffic, such as the dependency requests 138 and the dependency responses 140, onto the recovery simulation service 110. In some implementations, dependency traffic is replicated onto a shadow dependency service 144 that generates shadow dependency responses 146 that are based on the "real" dependency responses 140. Continuing with the cycle accessory search example, the recovery simulation service 110 may analyze the dependency traffic and configure the shadow dependency service 144 to mimic the third party vendors that provided supplemental search results. Thus, in processing a particular shadow production request that corresponds to the "real" cycle light production request, the shadow production system 116 may generate a shadow dependency request, e.g. because the results of the shadow production system 116 may also return supplemental results just as the production system did, and the shadow dependency service 144 may respond with a shadow dependency response(s) that substantively mirrors the corresponding "real" dependency response(s). It should be appreciated that similar to the client traffic replicator 122, the dependency traffic replicator 122 may act as a relay or fork, receiving the dependency requests 138 and dependency responses 140 and forwarding each to their respective recipients. While the example implementation shown in FIG. 1 shows the dependency traffic replicator 142 operating as a relay in the manner discussed above, this is not limiting and has been done for ease of illustration. In other implementations, the dependency services 136 could reply directly to the production system 106 without the dependency traffic replicator 142 acting as relay. Preferably, the dependency traffic replicator 142 does not affect or disrupt dependency traffic, e.g. its presence is imperceptible to the dependency services 136 and the production system 106.

Figure 2:
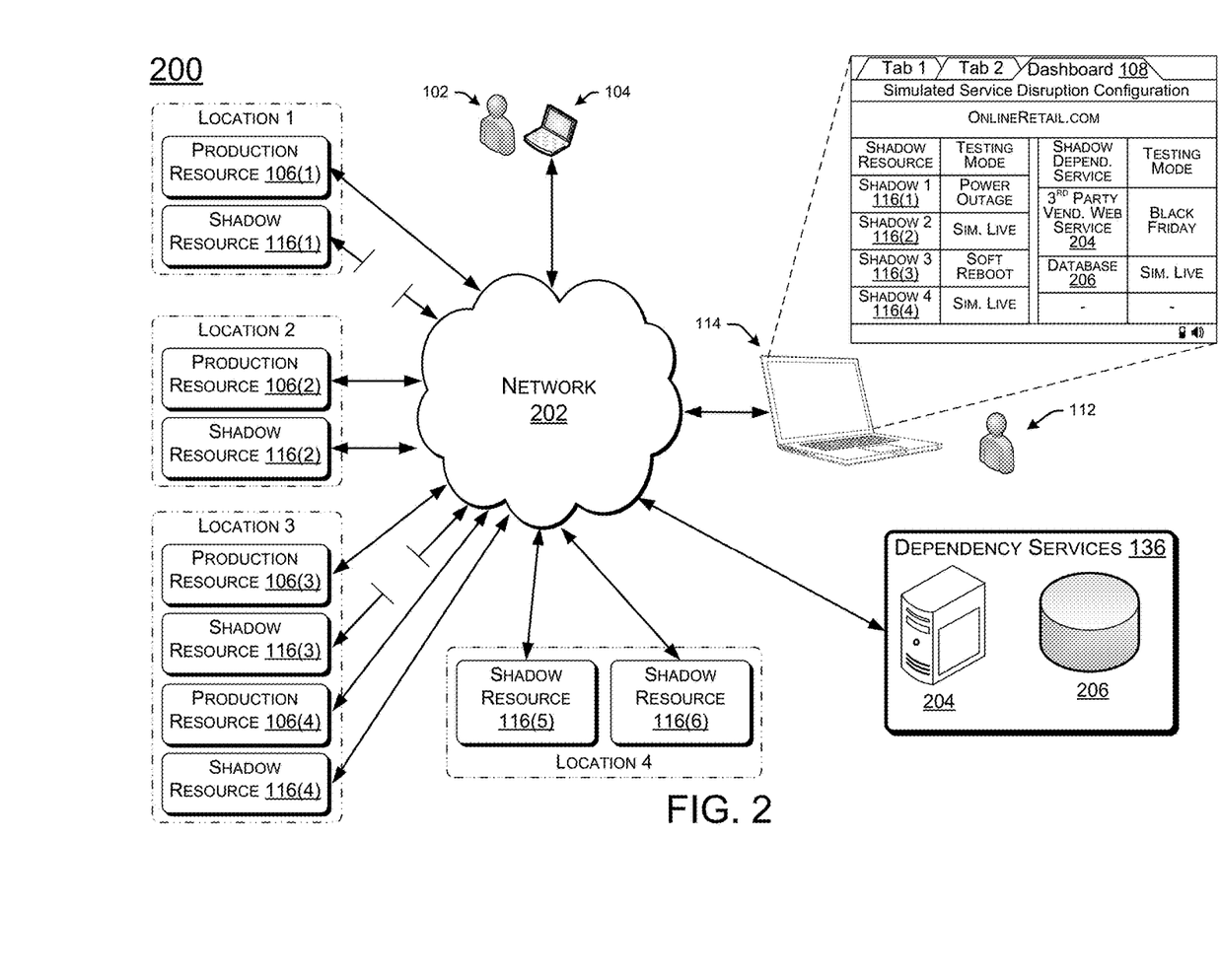
FIG. 2 is a schematic diagram of an illustrative communication system/network for managing a recovery simulation service through a dashboard application that is provided to a subscriber device.

FIG. 2 illustrates an overview of a communication system 200 for managing and implementing a recovery simulation service by one or more dashboard applications provided to a subscriber device. In the illustrated implementation, the production system 106 utilizes four production resources 106(1)-106(4) which are distributed over locations 1-3 which may be, for example, geographic locations or virtual locations. For example, each location may correspond to a server facility of a web hosting service, on which the production system 106 is hosted, and each production resource may represent a specified computing resource, e.g. a server, within each corresponding server facility. In the illustrated example, the production system 106 utilizes only a single computing resource at each of locations 1 and 2 while utilizing two production resources at location 3. Each of production resources 106(1)-106(4), the one or more client devices 104, and the dependency services 136 may be connected to a network 202 which may be representative of a local area network (LAN) or the world-wide web. It should be appreciated that the inter-connectivity of the various system components over the network 202 may enable the flow of both client traffic and dependency traffic (when applicable).

In the illustrated implementation, the subscriber 112 is provided access to the dashboard service 108, via the subscriber device 114, through which the subscriber 112 may configure a simulated service disruption to run on the shadow production system 116. In some implementations, the subscriber 112 may select or otherwise identify the production system (e.g. web based merchant service "OnlineRetail.com") and then the recovery simulation service 110 may identify production resources utilized by the production system 106, e.g. production resources 106(1)-(4), and duplicate these resources to the extent practicable. For example, the recovery simulation service 110 may identify particular production software programs running on each production resource, which may or may not be at least partially redundant across production resources, and then may duplicate each particular production software program identified onto the specific production resource on which it is operating. Therefore, because the illustrated system 200 includes four production resources, the recovery simulation service 110 may generate four corresponding shadow production resources 116(1)-116(4). Moreover, in order to duplicate the production system 106 as close as practicable, the recovery simulation service may generate corresponding shadow production resources 116(1)-116(4) with levels of accuracy down to the geographic location, individual server used to operative corresponding production resources, etc. In this way, if the production system 106 includes an order intake software component that is jointly run on production resources 106(3)-106(4) at location 3 while all other software is operated from locations 1 and 2, then the shadow production system 116 may be duplicated to retain this arrangement. However, it should be appreciated that duplication of the production system 106 to create the shadow production system 116 may be performed to various degrees of precision. For example, it is within the scope of the present disclosure that a distributed production system may be consolidated into a shadow production system that resides on a single computing resource.

As alluded to above, the dashboard service 108 may enable the subscriber 112 to enter parameters for configuring a simulated service disruption, e.g. a service disruption induced onto the shadow production system 116 but which does not affect the operation of the production operation system 106. The representative parameters include but are not limited to particular types of service disruptions and/or operational states to simulate with respect to the shadow production system or resources thereof or even the dependency services. For example, FIG. 2 illustrates that the subscriber 112 has entered configuration parameters (e.g. disruption parameters) for the recovery simulation service 110 to simulate operation of the shadow production system 116 as if there were a power outage on shadow production resource 116(1) while shadow production resource 116(3) is undergoing a soft reboot, e.g. a graceful restart. Furthermore, the parameters will cause the simulation to occur with shadow production resources 116(2) and 116(4) being simulated as running in live operation, e.g. operating as normal. Based on the configuration parameters, service between shadow production resources 116(1) and 116(3) and network users may be disrupted as illustrated, e.g. the severed links shown in FIG. 2. Therefore, if client traffic is generally distributed evenly across all production resources and each production resource performs as a perfect substitute for each other production resource then the shadow production system capacity will be roughly half that of normal operation of the production system. However, one of skill in the art will appreciate that many potential system variables may cause the actual behavior of the shadow production system to vary.

Moreover, the dashboard service 108 may enable the subscriber 112 to enter testing modes for dependency services 136. For example, the production system 106 may be partially dependent on each of a third party vendor web service 204 and a remote database 206. As discussed above, for example, upon submission of a production request for information associated with cycle accessories, the production system 106 may transmit a dependency request to a third party vendor for supplemental search results. However, just as the production system 106 may perform differently under different client traffic loads (or other conditions for that matter) so may the third party vendor's system(s). Therefore, as illustrated in FIG. 2, the subscriber 112 may set parameters for the shadow dependency services as well such as configuring a web service 204, e.g. of the third party vendor, simulate processing of and responding to dependency requests as the "real" dependency services would during the heightened client traffic, such as heightened client traffic experienced on Black Friday. It should be appreciated that, as with other examples disclosed herein, the foregoing is for explanatory purposes only and is not intended to limit the scope of the disclosure.

In some implementations, the recovery simulation service 110 may generate one or more additional shadow production resources, e.g. 116(5) and 116(6), at either an existing location of the production system 106 (e.g. locations 1-3) or a new location (e.g. location 4) at which the production system 106 does not currently have any production resources. In this way, the recovery simulation service 110 may enable the subscriber 112 to generate various production resource architectures and then simulate various service disruption types onto the various production resources. For example, a particular business may intend to consolidate or co-locate various production resources in order to improve system performance by, for example, decreasing the amount of traffic which must flow through the network 202. However, consolidating or co-locating production resources may also carry some increase in associated risk. For example, if all production resources for a particular business are co-located in one single server facility then the system performance may increase due to decreased network traffic, e.g. inter-system requests and responses spend less time being routed between resources, while the risk of a total system service disruption may be increased, e.g. a single catastrophic event such as an natural disaster may affect the entire system as opposed to only a few computing resources thereof. Furthermore, it should be appreciated that the locations may also be deliberately selected based on geographical characteristics. For example, a subscriber may choose not to select numerous different locations which are all within a particular geographical region which could be affected in the same way as other locations. In particular, it should be appreciated that distributing a particular computing architecture over numerous locations all within a particular geographic region, e.g. southern Florida, which has a particular vulnerability, e.g. hurricanes and associated flooding, may be inadequate to mitigate risks. Accordingly, by generating various distributed computing system architectures and then simulating various types of service disruptions, e.g. a regional power outage or natural disaster, a subscriber may chose an optimum tradeoff between the benefits and risks of co-location.

In some implementations, additional shadow production resources may be generated in order to explore or demonstrate the benefits associated with scalability of the production system 106. For example, subscriber 112 may create a shadow production system which is a scaled up (or down) version of the "live" production system and then simulate various service disruption scenarios thereon. In this way, the subscriber 112 may be able to make informed decisions about the prospective benefit of scaling up or cost of scaling down the production system. Based on the results of such modeling, the recovery simulation service 110 may be configured to generate scalability recommendations which compare a productions system's current ability to handle regular traffic and/or withstand a service disruption versus that which the production system could have if scaled up or down in terms of utilized computing resources.

In some implementations, a particular service disruption may include ceasing to operate production resources at one or more particular locations for reasons unassociated with the functionality of the production resources. For example, one or particular production resources may be located in an area that is subject to political risks, e.g. a military coup, which could compromise the production resources or data thereon. Accordingly, a subscriber may wish to determine the costs associated with shutting down all resources at that location, e.g. 116(3) and 116(4), and optionally moving those resources to a new location, e.g. location 4, as new production resources, e.g. 116(5) and 116(6). In some implementations, one or more asymmetric encryption keys may be transmitted to the at risk location with which the production resources or data thereof is at least partially encrypted. For example, shadow production resources 116(3) and 116(4) may be encrypted at location 3 so that even if the location were physically or digitally taken over, e.g. by a foreign government wishing to hijack data contained at that location, the risk of a security breach of the resources is mitigated. Moreover, now encrypted shadow production resources 116(3) and 116(4) may be transmitted to a new location, e.g. location 4, and decrypted to generate shadow production resources 116(5) and 116(6). Thus, a subscriber may be able to determine the costs and/or performance deficiencies which would be associated with having to conduct a shut down or relocation operation of one or more computing resources of a live production system.

Figure 3:
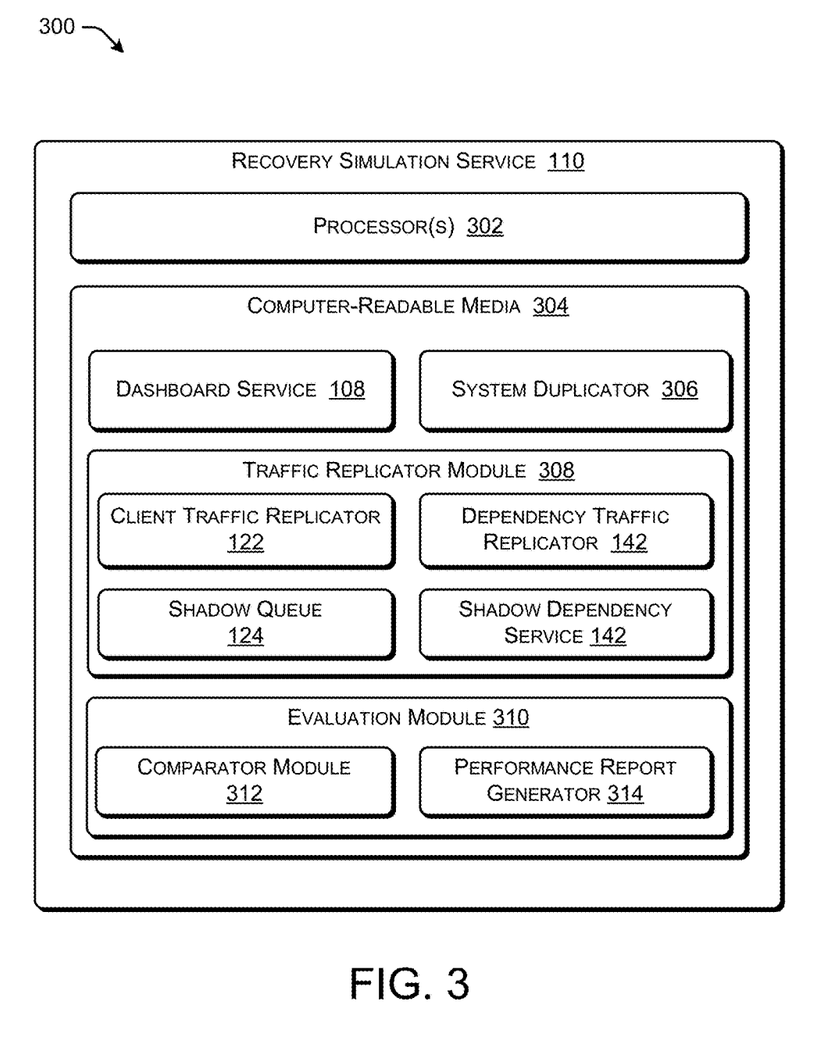
FIG. 3 is a schematic diagram of an illustrative computing architecture of an example recovery simulation service that provides for recovery characteristic evaluation of one or more shadow production systems.

FIG. 3 is a schematic diagram of an illustrative computing architecture 300 of an example recovery simulation service 110 that provides for recovery characteristic evaluation of one or more shadow production systems, e.g. at least partial duplicates of "real" production systems. The computing architecture 300 may be implemented in a distributed or non-distributed computing environment.

The computing architecture 300 may include one or more processor(s) 302 and computer readable media 304 that store various modules, applications, programs, or other data. The processor(s) 302 may be a single processing unit or a number of processing units, all of which may include single or multiple computing units or multiple cores. The processor(s) 302 can be implemented as one or more hardware processors such as microprocessors, microcomputers, microcontrollers, digital signal processors, central processing units, state machines, logic circuitries, and/or any devices that manipulate signals based on operational instructions. Among other capabilities, the processor 302 can be configured to fetch and execute computer-readable instructions stored in the computer-readable media 304, a mass storage device, or other computer-readable media. The computer-readable media 304 may include instructions that, when executed by the one or more processors 302, cause the processors to perform the operations described herein for the recovery simulation service 110. In some embodiments, the computer-readable media 304 may store the dashboard service 108, a system duplicator 306, a traffic replicator module 308, an evaluation module 310 and associated comparator module 312 and performance report generator 314, which are described in turn. The components may be stored together or in a distributed arrangement.

As described above, the dashboard service 108 may operate to receive configuration parameters for controlling the operation of the recovery simulation service 110. For example, the dashboard service 108 may receive a selection of a production system 106 to be duplicated for recovery simulation purposes. In additional to straight duplication, the dashboard service may enable a user to implement production system updates on the shadow production system 116 prior to launching the production system updates into live operation. For example, the production system 106 may have previously experienced a service disruption due to a system attack, e.g. a Distributed Denial of Service (DDoS) attack, in which case updates may be desirable to prevent similar attacks from disrupting service. In such a case, the dashboard service 108 may be used to duplicate the production system 106 to create the shadow production system 116 and then to recreate the DDoS attack onto the shadow production system 116, which has been modified to increase the system's resistance to such attacks. Because the shadow production system 116 does not affect live operation of the production system 106, it may be repetitively attacked (or otherwise disrupted, e.g. reboots) while continuously improving the shadow production system's ability to withstand attacks or recovery from other types of service disruptions. It should be understood that although embodiments are described wherein subscriber 112 operates the dashboard service 108 via a subscriber device 114 it is contemplated that various other persons may also utilize the dashboard service 108.

The system duplicator 306 may operate to at least partially duplicate the production system 106 to create the shadow production system 116. As alluded to above, it should be understood that duplication of the production system 106 may be an absolute duplication, e.g. the shadow production system 116 may be a perfect mirror copy of the production system 106, or may be less than absolute duplication. For example, in various implementations the system duplicator 306 may duplicate the production system 106 to the extent practical to create the shadow production system 116 in an effectively quarantined configuration. Stated alternatively, various implementations may create a shadow production system 116 that operates substantively identical, e.g. produces identical results with respect to the substance of interest of requests, but which may undergo soft reboots, hard reboots, malicious attack simulations (e.g. DDoS attacks), or any other type of service disruption, while remaining invisible to the production system 106, dependency services 136, client devices 104, etc.

In some implementations, the shadow production system 116 may be a scaled version of the production system 106 such that one or more components of the shadow production system 106 vary in size or capacity from the production system. For example, the shadow production system 116 may be scaled to include 50% of the processing capacity of the production system 106. In some implementations, the shadow production system 116 may be scaled down, e.g. scaled to less than 100% of the production system 106, in order to lessen usage of one or more resources used by the shadow production system. For example, the shadow production system 116 may be scaled down to 10% of the production system 106 and any interpretations of the shadow production system's behavior adjusted for this scaling factor. Furthermore, the shadow production system 116 may be scaled up to more than 100% of the production system 106. For example, a particular service disruption may be caused on the shadow production system 116 at a variety of different scales to observe changes in recovery characteristics.

The traffic replicator module 308 may operate to at least partially replicate any observed traffic to and from the production system 106 onto the recovery simulation service 110. The replicated traffic may then be analyzed by the recovery simulation service 110 and utilized to conduct simulated operation of and, more particularly, simulated service disruptions on the shadow production system 116. In some implementations, the client traffic replicator 122 may replicate traffic between the client device(s) 104 and the production system 106 and this traffic may then be used to generate shadow production requests 126 which correspond to the production requests 118, e.g. individual production requests may be duplicated to the extent possible to maintain the functional and quarantined operation of the shadow production system 116. For example, in a situation where the system duplicator 306 has created the shadow production system 116 as an absolute mirror copy of the production system 106, then it may be necessary for the traffic replication module 308 to dynamically modify any replicated traffic which may interact with the shadow production system 116 to effectuate the quarantining of the shadow production system 116, e.g. if a perfect duplicate request were sent to a perfect duplicate shadow production system 116 then a corresponding shadow production response may be unintentionally routed to a real client. Moreover, it should be appreciated that replicated client traffic may be stored in the shadow queue 124 which may forward shadow production requests 126 to the shadow production system 116 in non-real time, e.g. forwarding each one of the shadow production requests 126 may be delayed a predetermined amount of time from each corresponding "real" production request. Furthermore, as described in more detail below, configuration parameters may be received which manipulate the forwarding rate of the shadow production requests 126. In summary, the combination of the client traffic replicator 122 and the shadow queue 124 act together to impersonate the one or more user devices 104 while the manner of impersonation may be modified.

In some implementations, the dependency traffic replicator 142 may replicate traffic between the dependency service(s) 136 and the production system 106 and this traffic may then be used to generate shadow dependency responses 146 which correspond to the dependency responses 140, e.g. individual dependency responses may be duplicated to the extent possible to maintain the functional and quarantined operation of the shadow production system 116 while providing the shadow production system 116 with supplementary content, via the shadow dependency service 318, to fulfill shadow production requests 126 as the production system 106 received in live operation. For example, upon receipt of a particular shadow production request that corresponds to a particular "real" production request, the shadow production system 116 may generate a particular shadow dependency request that is at least similar to the corresponding "real" dependency request created and sent to the dependency services 136. The particular shadow dependency request may be sent to the shadow dependency service 144 which simulates how the dependency service 136 would actually respond. Moreover, as described above, configuration parameters may be received which manipulate the forwarding rate of the shadow dependency responses 146, e.g. the rate may be slowed to simulate high traffic, such as traffic experienced on Black Friday. In summary, the combination of the dependency traffic replicator 142 and the shadow dependency service 142 may act together to impersonate the dependency services 136.

In various implementations, the evaluation module 310 may operate to indirectly evaluate one or more recovery characteristics of the production system 106 by directly evaluating one or more recovery characteristics of the shadow production system 116. In particular, recovery characteristics of the shadow production system 116 may be assumed, with varying degrees of confidence depending on the simulation configuration, to correspond to at least generally to those of the "real" production system 106. Upon receiving both the production responses 120 and the shadow production responses 128, which correspond to particular production requests, the comparator module 312 may extract information from the responses to evaluate performance differences between the production system 106, e.g. during live operation, and the shadow production system 116 during disrupted operation. It should be appreciated that the extracted information is not limited to the subject matter queried in the respective requests but may include information usable to derive latency data or other performance metrics. For example, performance differences may include differences in reply time by the shadow production system 116. Furthermore, performance differences may include identifying the presence, absence, or duplicity of a particular shadow production response to correspond to a particular "real" production response, e.g. an overwhelmed shadow production system may fail to respond to all shadow production requests or may respond to the same shadow production request more than once.

In some implementations, the comparator module 312 tags and/or classifies at least some of the differences that are ascertained between the responses. For example, the comparator may tag or classify differences which are specified to be important or unacceptable to the functioning of the production system 106. In some implementations, extensible modeling language based definitions may be used to define specific characteristics of the responses for inclusion in the comparison prior to forwarding (or re-forwarding) by the traffic replicator module 308 based on a standardized format. Using such definitions, the comparator module 312 may allow differences based on planned functionality changes in the shadow production system 116 to be suppressed (e.g. ignored), e.g. shadow production responses being routed differently than production responses. In some implementations, such suppression of differences based on planned functionality changes in the shadow production system 312 may be implemented at a variety of levels and/or other modules rather than by the comparator module 312. The results of the comparator module 312 are provided to the performance report generator 314.

It should be noted that the differences that are compared are not limited to any particular type of differences. For example, the differences that are tagged may also include processing differences. An example of a processing difference is a difference in the processing of the request which may not change the result of the request or result in a latency difference in the response but which causes non-critical error messages or issues unnecessary or superfluous internal requests and may represent an additional processing burden on another system or process. A large number of such processing differences may cause other services or systems to become overwhelmed without an apparent difference in the timing or content of the response to the request.

The performance report generator 314 may generate performance reports based on results of the simulated service disruption on the shadow production system and such results may be benchmarked against normal and live operation of the production system 106. In some implementations, performance reports may include recovery characteristics such a duration of time which the shadow production system 116 may take to return to normal operation, e.g. operation wherein the shadow production responses substantively match and/or are provided with comparable timeliness as the production responses. For example, a particular recovery simulation may be configured to perform a soft reboot of the shadow production system to determine the time the associated processes take. Furthermore, recovery characteristics may include a measure of requests which were missed or otherwise not acceptably handled during the soft reboot procedure (or any other type of service disruption). Further, in some embodiments, the results of the simulated service disruption on the shadow production system may include performance differences associated with the shadow production system's 116 interaction with dependency services 136.

Figure 4:
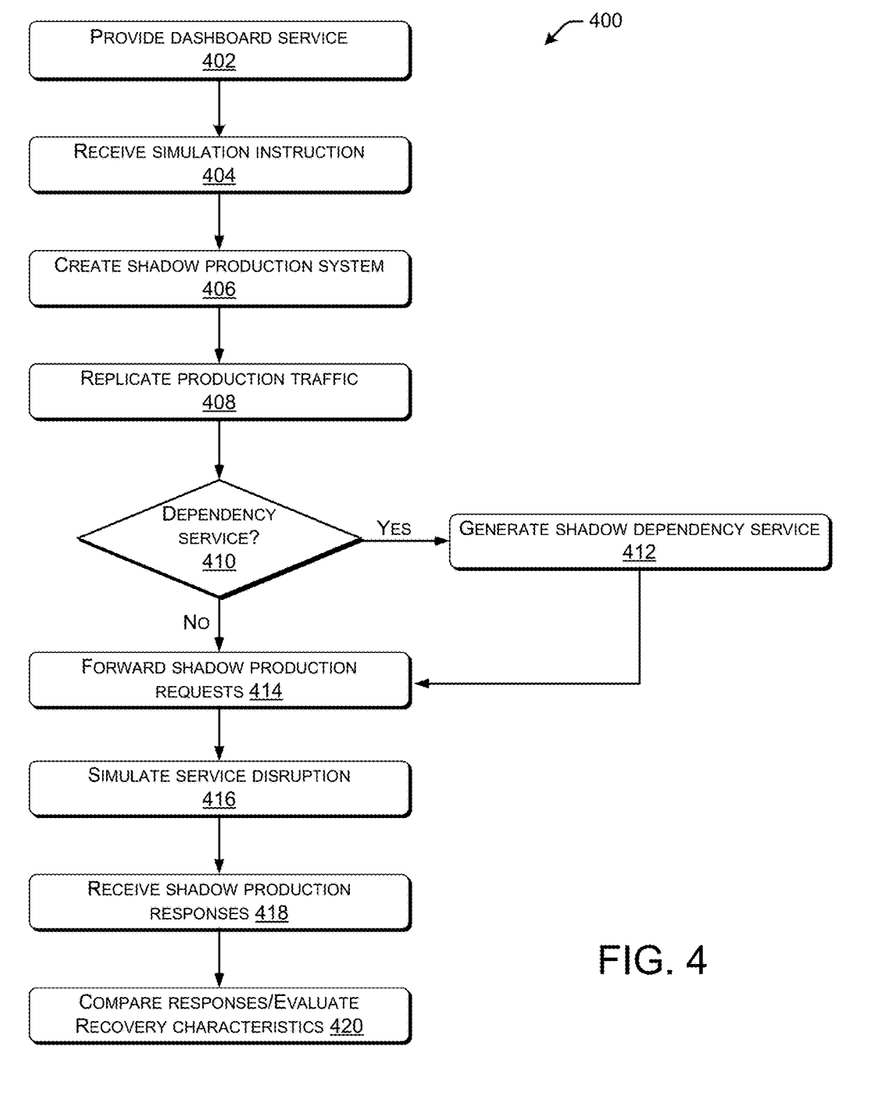
FIG. 4 is a flow diagram of an illustrative process to perform a recovery simulation and to evaluate recovery characteristics of a shadow production system.

FIG. 4 is a flow diagram of an illustrative process 400 to perform recovery simulation for recovery characteristic evaluation of one or more shadow production systems as described above regarding FIGS. 1-3. The process 400 may be performed by the recovery simulation service 110 in conjunction with the production system 106, the shadow production system 116, and the dashboard service 108. It should be appreciated that the process 400 (and other processes described herein) may be performed in other similar and/or different devices and/or in different environments. The process 400 is illustrated as a collection of blocks in a logical flow graph, which represent a sequence of operations that can be implemented in hardware, software, or a combination thereof. It should also be appreciated that the logical flow path depicted in FIG. 4 (and other logical flow paths described herein) are not to be construed to indicate that the described process steps need be performed in any particular order unless otherwise expressly and unambiguously stated as such elsewhere herein. Stated alternatively, the logical flow paths herein represent but a few of many possible orders which the steps may be performed. In the context of software, the blocks represent computer-executable instructions stored on one or more computer-readable storage media (e.g., machine readable storage media) that, when executed by one or more hardware processors, perform the recited operations. Generally, computer-executable instructions include routines, programs, objects, components, data structures, and the like that perform particular functions or implement particular abstract data types. Embodiments may be provided as a computer program product including a non-transitory computer-readable storage medium having stored thereon instructions (in compressed or uncompressed form) that may be used to program a computer (or other electronic device) to perform processes or methods described herein. The computer-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/computer-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be Internet download. The order in which the operations are described is not intended to be construed as a limitation, and any number of the described blocks can be combined in any order and/or in parallel to implement the process. Other processes described throughout this disclosure (e.g. FIG. 5), in addition to process 400, shall be interpreted accordingly.

At 402, the recovery simulation service may provide a dashboard service 108 through which configuration parameters may be entered to manage a recovery simulation. As described above, the configuration parameters may include a selection of the production system 106, e.g. by providing a domain name and log-on credentials for a corresponding web hosting service to provide access to the underlying production system software or code. The configuration parameters may also include a selection of type of service disruption to simulate with respect to the production system 106, i.e. on the shadow production system 116.

Furthermore, other types of configuration parameters may also be entered via the dashboard service 108. In some implementations, for example, the production system 106 may include a plurality of networked computing resources (as depicted in FIG. 2) and the configuration parameters may define particular types of service disruptions for simulation on particular ones of the plurality of networked computing resources. Stated alternatively, the recovery simulation service 110 may be configured to direct a simulated service disruption toward less than all of (e.g. a subset) of shadow computing resources. Moreover, in some implementations, the configuration parameters may define a particular cache management process for the shadow cache 134 to be populated in accordance with during a simulated service disruption. Such cache management processes include writing a cache image 132 of the production system 106 into the shadow cache 134 or processes which cause each cache entry to be initially processed by the shadow production system 116 prior to cache entry, e.g. such that a cache miss always precedes a cache hit for a given query. Additionally, as is discussed in more detail below, the configuration parameters may also prescribe a degree of elasticity of the shadow production system 116. Stated alternatively, the subscriber 112 may dynamically modify the ability of the shadow production system to autonomously adapt its capacity in response to workload.

At 404, the recovery simulation service 110 may receive an instruction to evaluate one or more recovery characteristic of the production system 106 by simulating a service disruption, corresponding to the configuration parameters, onto a shadow production system 116. The instruction may include the configuration parameters entered via the dashboard 108 as well as any other information necessary to simulate the specified type(s) of service disruption. Once the instruction is received, the recovery simulation service 110 may begin generating various systems and defining relationships necessary to perform the simulation.

At 406, the recovery simulation service 110 creates a shadow production system 116 by wholly or partially duplicating the production system 106 that was selected via the dashboard service 108. As described above, in some implementations, the shadow production system 116 is created by duplicating the production system 106 as closely as practicable. For example, the recovery simulation service 110 may identify specific components (e.g. specific computing resources) of the production system 106 as well as corresponding locations thereof and may create the shadow production system 116 with the same degree of precision where possible. Continuing with this example, the shadow production system 116 may be hosted on precisely the same components, e.g. web hosting services or servers thereof, as the production system 106.

At 408, client traffic is replicated onto the recovery simulation service 110 to be stored, analyzed, and modified as necessary to implement process 400. For example, each production request may be stored along with its corresponding production response. Based on the production requests, the recovery simulation service 110 may create shadow production requests 126 and store each along with its corresponding "real" production request and its corresponding "real" production response. Similar to the shadow production system 116, the shadow production requests 116 may be transformed as necessary to implement a substantively duplicate, yet quarantined, model of the client traffic to and from the production system 106.

At decision block 410, the recovery simulation service 110 determines whether the shadow production system 116 relies upon dependency services to fulfill shadow production request 126. For example, in situations which the production system 106 utilizes dependency services 136, the recovery simulation service 110 may carry these dependencies over into the shadow production system 116.

Based on a determination that shadow production system 116 does rely upon dependency services, the process 400 may proceed to block 412 at which shadow dependency service(s) 144 may be generated in order to receive shadow dependency requests 148, from the shadow production system 116, and responds thereto. Similar to creating the shadow production system 116, the shadow dependency services 136 may be created to simulate the actual dependency traffic to the extent practicable.

Based on a determination that shadow production system 116 does not rely upon dependency services, the process 400 may proceed to block 414 at which the recovery simulation service 110 forwards shadow production requests 126 to the shadow production system 116 for processing. In some implementations, the forwarding of the shadow production requests 126 may occur at varying rates depending on the configuration parameters. For example, configuration parameters may be entered via the dashboard service 108 which increase or decrease the rate at which the shadow production requests 126 are forwarded to the shadow production system 116 in order to effectively increase or decrease the processing load on the shadow production system 116. Furthermore, in some implementations, configuration parameters may be set which cause unserved or un-responded to shadow production requests 126 to be periodically re-forwarded to the shadow production system 116 from the shadow queue 124. For example, at least some clients may respond to unserved requests by trying again and some client devices and/or systems may be configured to automatically re-forward requests to (e.g. re-ping) production systems until their request is fulfilled. Accordingly, as the shadow production system 116 recovers from a service disruption there may be a surge of requests that were received and unserved during the outage, e.g. a rate of request higher than would occur during steady state operation, until the shadow production system 116 is able to effectively process through the backlog of unserved requests.

At block 416, a service disruption corresponding to the configuration parameters is simulated on the shadow production system 116. For example, the configuration parameters may cause the shadow production system 116 to undergo a soft reboot procedure, be forced into a hard reboot, or experience a power outage at one or more shadow computing resources. Furthermore, in some implementations, the service disruption to the shadow production system 116 may include a simulated disruption to one or more shadow dependency services, e.g. access to a third party vendor's web services may be disrupted.

At 418, the recovery simulation service 110 may receive shadow production responses 128 corresponding to the shadow production requests forwarded at block 414.

At 420, the recovery simulation service 110 may operate to compare the shadow production responses 128 received at block 418 with corresponding "real" production responses, e.g. from the client traffic received and stored at block 408, in order to determine performance differences between live operation of the production system 106 and operation of the shadow production system 116 as disrupted according to block 416. Furthermore, at block 420 the recovery simulation service 110 may operate to evaluate (e.g. estimate or assess) recovery characteristics of the production system 106 based on the resulting performance differences in the manner discussed above. In some implementations, an evaluation is provided, via the dashboard service 108, which includes an estimated service deficiency that the simulated service disruption would have caused the production system 106. For example, recovery simulation service 110 may monitor a duration of time which the shadow production system takes to recovery from the service disruption, a number of requests which go unserved by the shadow production system due to the service disruption, or a delay in the processing of one or more of the shadow production requests. Accordingly, the estimated service deficiency may provide the foregoing information to the subscriber as a quantification of how deficient service of the production system 106 would be in the event of a particular type of service disruption.

In some implementations, the evaluation may include an estimated a cost to an owner that would result from a service disruption to the production system 106 based on the duration which the shadow production system 116 takes to recover from the disruption. One specific example may include the recovery simulation service 110 determining an estimated cost of downtime (e.g. dollars per minute of downtime) and may multiply the estimated cost by the duration to obtain a cost of the duration. Another specific example may include the recovery simulation service 110 determining or estimating an average cost of unserved requests (e.g. the average profit per production request has historically been $100 for every 100 requests or $1/request) and multiplying the dollar amount per request by the total number of requests. Furthermore, estimates may be made with respect to the cost of untimeliness, e.g. impatient consumers may patron a competing service or forego a sale if request processing is perceived by them as too slow.

It should be appreciated that cost of a service disruption may be estimated as null during periods which service is not disrupted. Therefore, in some implementations the shadow production system 116 may be ramped up to live operation prior to the onset of the simulated service disruption because during this period the cost of the service disruption may be estimated as null. Furthermore, the shadow production system 116 may be allowed sufficient time to recover from the service disruption and, therefore, also regain live operation following the disruption. Therefore, data may be collected regarding the service disruption from a time before the service disruption and continue to a time after the service disruption so that all costs incurred between those points in time may be aggregated as an estimation of the total cost the production system would incur. It should be appreciated that the foregoing description of measuring costs and/or other performance deficiencies associated with the service disruptions are for explanatory purposes only and that other ways of measuring such costs are within the scope of the present disclosure. Other exemplary ways of measuring such cost and/or other performance deficiencies may include, but are not limited to, those described in U.S. patent application Ser. No. 14/32,163 to McClintock et al. which is fully incorporated herein by reference in its entirety.

Figure 5:
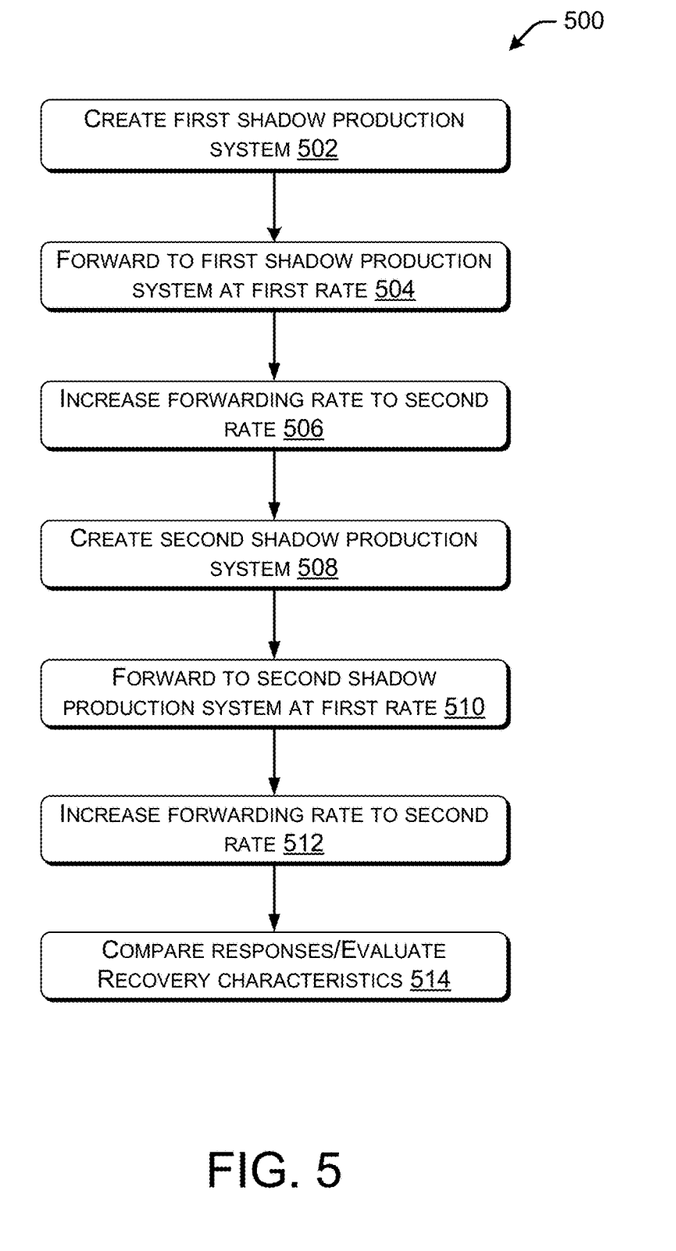
FIG. 5 is a flow diagram of an illustrative process to perform a recovery simulation and to evaluate recovery characteristics of two or more shadow production systems of varying elasticity.

FIG. 5 is a flow diagram of an illustrative process 500 to perform recovery simulation for recovery characteristic evaluation of two or more shadow production systems. At block 502, a first shadow production system may be created in a similar manner as described herein. For example, the first production system will typically be an at least partial duplicate of a "real" production system that is in live operation. In some implementations, the first shadow production system has a first degree of elasticity which may correspond to the production system it was duplicated from. The first degree of elasticity may represent an ability of the shadow production system to autonomously dynamically increase or decrease its own capacity, e.g. ability to handle a particular workload, in response to changes in its work load. For example, perfectly elastic shadow production system may be able to instantaneously increase its own capacity in response to increased workload and instantaneously decrease its capacity once the workload subsides. Moreover, a perfectly inelastic shadow production system would not possess any ability to dynamically increase or decrease its own capacity.

At block 504, shadow production request are forwarded to the first shadow production system at a first rate, e.g. requests per minute. In some implementations, the first shadow operating system is capable of operating substantively identical to a corresponding production system, e.g. production system 106. Stated alternatively, the shadow production system is able to produce responses which are substantively identical at a similar response time as the production system. Then, at block 506 the forwarding rate may be increased from the first rate to a second rate at which the shadow production system becomes unable to operate as intended. For example, processing capacity of the first shadow production system may be unable to handle the second rate of requests and a service disruption may then occur. It should be appreciated that some forms of web service attacks, e.g. DDoS attacks, are designed to overwhelm the processing capacity of a targeted system and, therefore, the process step at block 506 (and 512 for that matter) somewhat resemble such attacks. Moreover, it should be appreciated that because the first shadow production system is unable to handle the second rate of requests, the first degree of elasticity is less than perfect elasticity.

At block 508, a second shadow production system is created which may have a second degree of elasticity which is greater than the first degree of elasticity meaning that second shadow production system is more capable of autonomous dynamic capacity modifications than the first shadow production system. At block 510, shadow production request are forwarded to the second shadow production system at the first rate at which the second shadow operating system is capable of operating substantively identical to a corresponding production system, e.g. production system 106. Then, at block 512 the forwarding rate may be increased from the first rate to a second rate. Depending on the second degree of elasticity, the second shadow production system may be able to dynamically increase its capacity to handle the increasing of the forwarding rate at block 512.

Therefore, a user may be able to utilize process 500 to reconstruct or otherwise model a DDoS type attack (or other similar attacks) and determine a minimum degree of elasticity required to withstand such an attack from the starting point, e.g. starting capacity, of a particular production system.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method performed by a recovery simulation service, the method comprising steps of:
   under control of one or more processors configured with executable instructions,
   providing, to a subscriber of a virtualized computing resource, a dashboard service configured to receive a selection of a production system that is hosted by the virtualized computing resource and at least one type of service disruption, the production system being in live operation;
   receiving, through the dashboard service, an instruction associated with evaluating one or more recovery characteristics of the production system corresponding to the at least one type of service disruption;
   duplicating, at least partially, the production system to create a shadow production system;
   replicating, onto the recovery simulation service, client traffic between one or more clients and the production system, the client traffic including at least a plurality of production requests;
   simulating, while the production system remains in live operation, the at least one type of service disruption on the shadow production system, wherein the simulating causes at least a portion of the shadow production system to undergo a reboot procedure;
   sending, from the recovery simulation service, a plurality of shadow production requests to the shadow production system for processing, the plurality of shadow production requests being based on the plurality of production requests;
   receiving a plurality of shadow production responses from the shadow production system, the plurality of shadow production responses being responsive to the plurality of shadow production requests;
   determining performance differences between the production system generating production responses and the shadow production system generating shadow production responses, the performance differences being based on live operation of the production system and disrupted operation of the shadow production system; and
   providing an evaluation of the one or more recovery characteristics of the production system based on the performance differences between the production system and the shadow production system.

2. The method as recited in claim 1, further comprising:
   replicating, onto the recovery simulation service, dependency traffic between one or more dependency services and the production system, the dependency traffic including a plurality of dependency requests and a plurality of dependency responses;
   receiving a plurality of shadow dependency requests from the shadow production system, the plurality of shadow dependency requests being generated by the shadow production system for processing the plurality of shadow production requests; and
   in response to the plurality of shadow dependency requests, sending a plurality of shadow dependency responses to the shadow production system.

3. The method as recited in claim 1, wherein the dashboard service is further configured to enable the subscriber of the virtualized computing resource to:
   input disruption parameters associated with the at least one type of service disruption; and
   initiate the step of simulating the at least one type of service disruption on the shadow production system, wherein the simulating is at least partially based on the disruption parameters.

4. The method as recited in claim 3, wherein the disruption parameters cause the simulating to include at least one of: a soft reboot of the shadow production system; a hard reboot of the shadow production system; a disruption of one or more shadow dependency services; or a power outage.

5. The method as recited in claim 1, wherein the evaluation includes a service deficiency estimation, corresponding to the production system, of the at least one type of service disruption, the service deficiency estimation based on at least one of a duration of the at least one type of service disruption on the shadow production system, a number of unserved requests by the shadow production system, or a delay in processing one or more of the plurality of shadow production requests.

6. The method as recited in claim 1, wherein the sending the plurality of shadow production requests to the shadow production system continues from a first time that is before the simulating the at least one type of service disruption to a second time that is after the simulating the at least one type of service disruption.

7. A computer-implemented method, comprising:
   under control of one or more processors configured with executable instructions,
   creating, on a recovery simulation service, a shadow production system that is at least a partial duplicate of a production system;
   replicating, into a shadow queue of the recovery simulation service, a plurality of production requests being transmitted between the production system and one or more clients;
   simulating a service disruption on the shadow production system to cause disrupted operation of the shadow production system, the simulating occurring while the production system remains in live operation;
   sending, to the shadow production system from the shadow queue, a plurality of shadow production requests that are at least partial duplicates of the plurality of production requests;
   receiving, from the shadow production system, a plurality of shadow production responses that are responsive to the plurality of shadow production requests; and
   determining performance differences between live operation of the production system and disrupted operation of the shadow production system, the performance differences being caused by the simulating the service disruption.

8. The method as recited in claim 7, further comprising providing a recovery characteristic evaluation associated with the production system based on the performance differences between live operation of the production system and disrupted operation of the shadow production system.

9. The method as recited in claim 7, further comprising:
storing the plurality of shadow production requests in the shadow queue; and
increasing a rate of the sending from a first rate, at which the shadow production system operates substantively identical to the production system, to a second rate at which disrupted operation of the shadow production system occurs, the shadow production system having a first degree of elasticity corresponding to the production system, the first degree of elasticity corresponding to an ability of the shadow production system to autonomously adapt capacity based on workload.

10. The method as recited in claim 9, further comprising:
creating, on the recovery simulation service, a second shadow production system that is an at least partial duplicate of the production system, the second shadow production system having a second degree of elasticity that is higher than the first degree of elasticity;
re-sending, to the second shadow production system from the shadow queue, the plurality of shadow production requests, wherein the re-sending includes increasing a rate of the re-sending from the first rate to the second rate;
receiving, from the second shadow production system, a second plurality of shadow production responses that are responsive to the plurality of shadow production requests; and
determining performance differences between the shadow production system and the second shadow production system, the performance differences being caused at least partly by the second degree of elasticity.

11. The method as recited in claim 7, wherein the creating includes duplicating, at least partially, a plurality of networked computing resources of the production system to create a plurality of networked shadow computing resources of the shadow production system.

12. The method as recited in claim 11, wherein the simulating the service disruption is directed toward a subset of the plurality of networked shadow computing resources.

13. The method as recited in claim 7, further comprising:
replicating a plurality of dependency requests and a plurality of dependency responses being transmitted between the production system and one or more dependency services;
receiving a plurality of shadow dependency requests generated by the shadow production system to obtain information corresponding to the plurality of shadow production requests; and
in response to the plurality of shadow dependency requests, sending a plurality of shadow dependency responses to the shadow production system, wherein the plurality of shadow production requests are stored in the shadow queue for at least a predetermined delay time prior to the sending the plurality of shadow production requests, and wherein the replicating the plurality of dependency requests and the plurality of dependency responses occurs at least partially during the predetermined delay time.

14. The method as recited in claim 7, further comprising:
generating a cache image corresponding to a production cache of the production system;
prepopulating a shadow cache based at least partially on the cache image; and
determining a performance benefit of the prepopulating the shadow cache, the performance benefit being relative to run time population of the shadow cache by the shadow production system based on the sending the plurality of shadow production requests.

15. The method as recited in claim 7, further comprising simulating responsiveness of the one or more clients to the service disruption by periodically re-sending, to the shadow production system from the shadow queue, a particular shadow production request of the plurality of shadow production requests until a corresponding shadow production response is received.

16. A system, comprising:
one or more processors; and
one or more computer readable media storing instructions that are executable by the one or more processors to perform acts comprising:
providing a dashboard service configured to receive at least an identification of a production system and a selection of at least one type of service disruption that is hazardous to the production system;
creating a shadow production system that is an at least partial duplicate of the production system;
replicating, onto the shadow production system, client traffic between one or more clients and the production system, the client traffic including a plurality of production requests;
simulating, during live operation of the production system, the at least one type of service disruption onto the shadow production system; and
evaluating recovery characteristics of the production system based on one or more performance differences between live operation of the production system and disrupted operation of the shadow system.

17. The system of claim 16, further comprising:
generating one or more shadow dependency services configured to communicate with the shadow production system, the one or more shadow dependency services being based on one or more dependency services of the production system.

18. The system of claim 16, wherein the dashboard service is further configured to receive an instruction to direct the simulating the at least one type of service disruption toward a subset of a plurality of networked shadow computing resources, the plurality of networked shadow computing resources being based on a plurality of networked computing resources of the production system.

19. The system of claim 16, wherein the dashboard service is further configured to receive a selection of a cache management process, and wherein the simulating includes populating a shadow cache in accordance with the cache management process.

20. The system of claim 16, wherein the dashboard service is further configured to receive one or more elasticity parameters prescribing a degree of elasticity of the shadow production system.

* * * * *